April 15, 1930. J. P. REMINGTON 1,754,485
VARIABLE SPEED GEARING
Filed Jan. 25, 1929
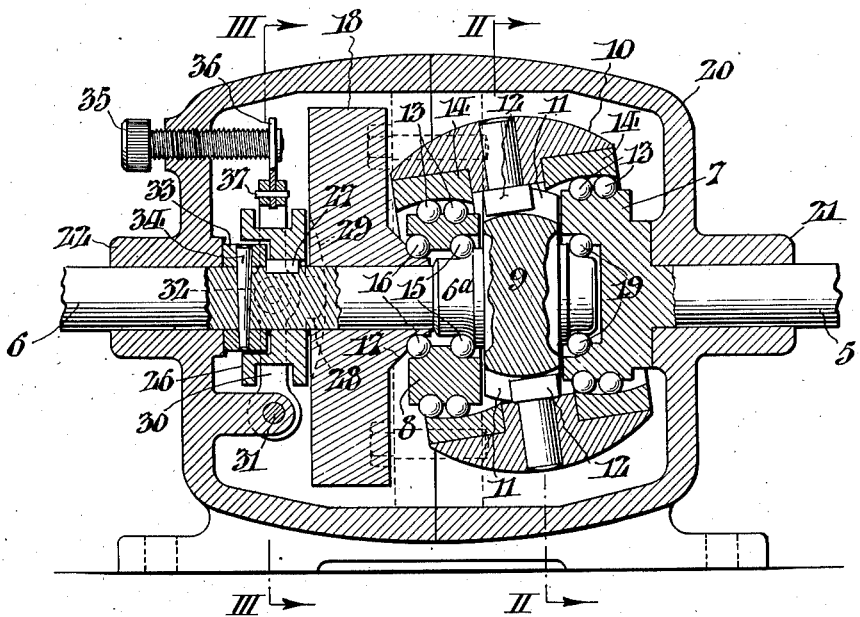
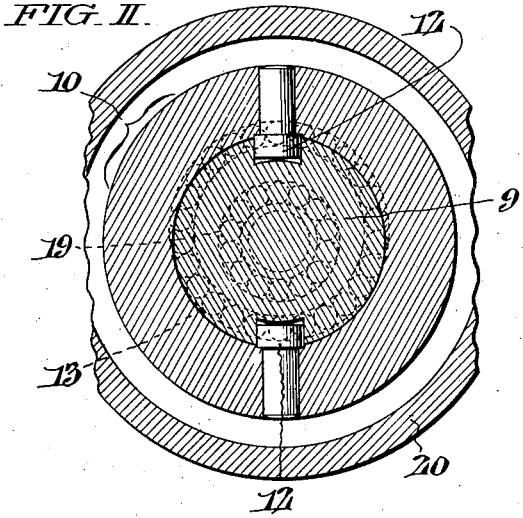
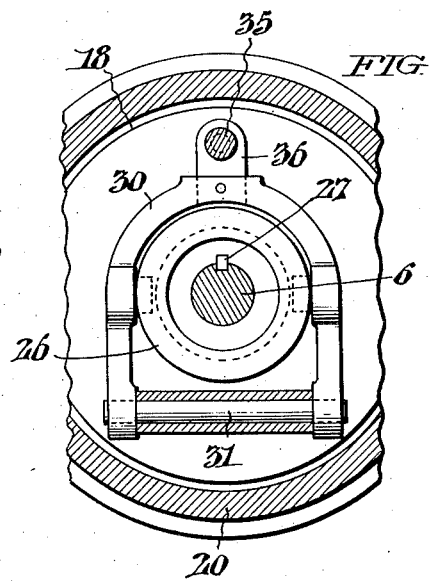
WITNESSES
INVENTOR:
Joseph Percy Remington
BY
ATTORNEYS.

Patented Apr. 15, 1930

1,754,485

UNITED STATES PATENT OFFICE

JOSEPH PERCY REMINGTON, OF PHILADELPHIA, PENNSYLVANIA

VARIABLE-SPEED GEARING

Application filed January 25, 1929. Serial No. 334,874.

This invention relates to variable speed gearing. Such gearing, for example, may be inserted in shafting anywhere between the source of power and the ultimate load, or incorporated within the cages of electric motors (especially alternating current motors), or applied to the crank shafts of internal combustion engines for automotive and other purposes. The invention affords a simple, rugged, compact, and relatively efficient type of gearing for such uses. In suitable forms of embodiment, such as hereinafter described, the invention affords the advantage of dispensing with toothed gearing, and thus avoiding its various well-known disadvantages.

In the drawings, Fig. I shows an axial midsection through a variable speed gearing conveniently embodying my invention.

Fig. II shows a transverse section through the device, taken as indicated by the line and arrows II—II in Fig. I.

Fig. III shows a transverse section, taken as indicated by the line and arrows III—III in Fig. I.

The gearing here illustrated is of a differential type. Besides co-axial driving and driven shafts 5, 6, it comprises a driving eccentric 7 fast to the shaft 5; an eccentric 8 freely rotatable co-axially with the shafts 5, 6; a fulcrum 9 (in the form of a spherical-edged disk), co-axial with the eccentrics 7, 8 and, in the present instance, located between them; and a member 10 engaged with both of the eccentrics 7, 8 to be oscillated by them, and fulcrumed on the member 9. As here shown, the eccentrics 7, 8 are of externally acting type, and the member 10 is engaged around them and around the fulcrum disk 9. The member 10 is oscillated by the eccentrics 7, 8, which are 180° apart, and is thereby rocked on the fulcrum 9 with a gyratory "wobble". Provision is made for a resistance to rotation of the eccentric 8, which causes the member 10 to revolve on the common axis of the eccentrics 7, 8, and in the same direction. This rotary movement of the member 10 is transmitted to the driven shaft 6. For this purpose, the fulcrum 9 itself may be utilized, by mounting it fast on the shaft 6 and engaging or connecting the member 10 with it, so as to cause the latter and the shaft 6 to turn with said member 10. As shown in Figs. I and II, the disk 9 has one or more longitudinal (axially extending) grooves or keyways 11, 11 in its periphery; and the member 9 has keys 12, 12 with round shanks freely turnable in radial holes in the member 10 and flat-sided heads engaged in the keyways 11, 11. These keys 12 do not interfere with oscillation or rocking of the member 10 relative to the member 9, but do compel the two to revolve together.

As shown in Fig. I, two annular sets of anti-friction balls 13 are interposed between each of the eccentrics 7, 8 and the member 10. These balls 13 travel in external raceways in the eccentrics 7, 8 and engage removable internal spherical-surfaced raceways 14 in the interior of the member 10. Likewise, annular sets of anti-friction balls 15, 16 are used in mounting the eccentric 8 around the shaft 6,—the balls 15 working between an internal raceway in the eccentric 8 and an external raceway on an enlarged portion 6ª of the shaft 6 adjacent the member 9, and the balls 16 between an internal raceway in the eccentric 8 and an external raceway on the hub 17 of a fly-wheel member 18 mounted on the shaft 6. In the present instance, provision is made for anti-frictional engagement between the shaft 6 and the eccentric 7, by means of an annular set of anti-friction balls 19 interposed between an internal raceway in one side of the eccentric 7 and an external raceway on the enlarged end of the shaft 6. This inter-engagement at 19 affords support for the end of the shaft 6 and obviates any tendency of the latter to bend or whip under the stresses imposed upon it in the operation of the gearing.

In the present instance, the operating parts are all enclosed in a two-part casing 20, which affords bearings 21, 22 for the shafts 5, 6. This casing 20 may also contain an oil bath, to provide for lubrication of the operating parts on the splash system.

To vary the resistance to turning of the eccentric 8, provision is made for exerting a varying lateral (axial) pressure on its bearings 15, 16 by a corresponding pressure on the fly-wheel 18,—which is loose on the shaft 6, and thus free to move lengthwise along it as well as to turn relative to it. For this purpose, there is a collar 26 loose on the shaft 6 at the left of the fly-wheel 18, constrained to turn with the shaft by a key and key-way engagement at 27, but free to move lengthwise of the shaft. This collar 26 has a pair of rounded lateral projections 28, 28 that are adapted to coact with corresponding double arcuate "crown" cam surfaces 29, 29 on the fly-wheel 18, formed by the curved and sloping bottoms of a couple of arcuate lateral grooves in the fly-wheel. The collar 26 may be moved along the shaft 6 and its projections 28, 28 pressed against the fly-wheel cams 29, 29 by means of a forked lever 30, pivotally fulcrumed on the casing 20 at 31 and provided with diametrically opposite rollers 32, 32 to engage in an external groove in the collar 26. There is also a collar 33 fast to the shaft 6 at the other side of the collar 26 from the fly-wheel 18, removably secured on the shaft by a taper key 34. As shown, this collar 33 is partly accommodated in a lateral recess in the collar 26. The lever 30 and collar 26 can be shifted either way along the shaft 6 by means of a screw 35 in the end wall of the casing 20, with its end rotatably engaged in the upper end 36 of said lever 30. As shown, this upper end 36 of the lever 30 is in effect a short leaf spring secured in a slot in the lever yoke by a pin 37. By turning the screw 35 either way, the spring 36 can be stressed to hold the collar 26 against the fly-wheel 18 or the collar 33 with any desired degree of pressure.

To make clear the operation of the device, let it first be assumed that no pressure at all (virtually) is being exerted on the bearings 15, 16 of the eccentric 8. Under this condition, clockwise revolution of the shaft 5 and the eccentric 7 will oscillate the member 10 (on or "about" the head 9 as a fulcrum) with a gyratory wobbling motion. This motion of the member 10 will naturally cause the eccentric 8 to revolve clockwise at the same rate as the eccentric 7,—but always 180° from the latter. As the member 10 oscillates as above described, it will oscillate or turn slightly on the round shanks of the keys 12, 12, first one way and then the other; and these keys will also oscillate back and forth in the grooves 11, 11.

While the projections 28, 28 are in the very bottoms of the cam recesses 29, 29, the parts 18, 26 will be free and loose between the collar 33 and the bearings 16, so as to revolve together freely (with the shaft 6) relative to the eccentric 8, without any friction or binding. And this condition can be assured by tightening up the screw 35, so as to bend the spring 36 to the right and hold the projections 28, 28 against the bottom of the cam recesses 29, 29. The slight vibration of the rotating parts coacts with the tension of the spring 36 and the slope of the cam surfaces 29, 29 to cause the part 18 to adjust itself, angularly, to the proper position for this.

Thus the gearing tends, automatically, to assume the "neutral", non-driving condition, in which the member 10 does not revolve nor drive the shaft 6, owing to the absence of resistance to turning of the eccentric 8.

If, however, the parts 18, 26 are caused to turn relative to one another a little, either way, so that the projections 28, 28 are displaced "up" the sloping bottoms of the recesses 29, 29, then there is a wedging action which separates and expands the parts 26, 18 in the axial direction, crowding and tightening them against the collar 33 and the bearings 16, 15. And this can be brought about by unscrewing the screw 35, so as to bend the spring 36 to the left and press the collar 26 against the collar 33. Under this condition, rotation of the part 26 will be resisted by its friction with the collar 33, and rotation of the collar 33 and the shaft 6 by friction between the collar 33 and the casing; while the friction in the bearings 16 will tend to cause the part 18 to turn with the eccentric 8. Accordingly, the rotation of the eccentric 8 will be resisted by the increased friction at the bearings 15, and the shaft 6 will be driven at a speed corresponding to this friction. The mechanical disadvantage of the mechanism is such that even a slight resistance to turning of the eccentric 8 will interfere with the free oscillation of the part 10 and cause it to revolve and drive the shaft 6. The speed of the member 10 and shaft 6 under these conditions will be determined by the degree to which the spring 36 is stressed (bent) to the left,—as well as by the load on the shaft 6. And if the pressure at 26, 34 and 16 should be so great as to prevent the eccentric 8 from turning at all, then the parts 7, 8, 9, 10, 6, 18, 26 will all revolve together at the same speed; i. e., there will be a "direct drive" from the shaft 7 to the shaft 8.

It remains to notice the behavior and action of the fly-wheel 18 as effected by its freedom to turn on the shaft 6.

As the shaft 6 revolves and the collar 26 with it, the coaction of the collar projections 28 with the cam surfaces 29 will start the fly-wheel 18 to revolving. Initially, the inertia of the fly-wheel 18 will cause it to "lag" a small angular distance, thus automatically increasing the spring tension at 36 (supertensioning the spring 36) and the pressure on the bearings 15, 16, —and, in consequence, increasing the torque exerted by the member 10 on the shaft 6. This, of course, will assist materially in starting and speeding up the "load" driven by the shaft 6. When the fly-wheel 18 becomes synchronized with the shaft 6 (as will happen very quickly), then the fly-wheel will retrieve its lag (aided by the reaction of the balls 16 with their races on the fly-wheel hub 17, and by the vibration of the parts); and the supertension on the spring 36 will be relieved. Thus a running balance of the forces affecting the fly-wheel 18 will be established. Whenever a variation in the speed of the shaft 5 occurs (or of the load on the shaft 6), the compensatory action of the fly-wheel 18 above described will be repeated.

Having thus described my invention, I claim:—

1. A variable speed transmission comprising coaxial eccentrics, one driven from a source of power and the other freely rotatable; a member engaged with both of said eccentrics to be oscillated by them; a fulcrum for said member permitting oscillation thereof by said eccentrics; transmission means for transmitting rotation of said member due to its coaction with said eccentrics and fulcrum; and means for controlling and varying the resistance to rotation of said freely rotatable eccentric.

2. A variable speed transmission comprising coaxial eccentrics, one driven from a source of power and the other freely rotatable; a fulcrum member between said eccentrics coaxial with them; a hollow member engaged around said eccentrics and fulcrum member, free for turning relative to the eccentrics and for rocking relative to the fulcrum member; transmission means operatively connected to said hollow member for transmitting rotation thereof due to its coaction with said eccentrics and said fulcrum member; and means for varying the resistance to rotation of said freely rotatable eccentric.

3. A variable speed transmission comprising coaxial driving and driven shafts, an eccentric fast on one of said shafts and an eccentric free to turn on the other; a fulcrum head between said eccentrics; a hollow member engaged around said eccentrics and head and fulcrumed on the latter, free for turning relative to the eccentrics and for rocking relative to the head, but connected to the driven shaft to cause the latter to turn with said intermediate member; and means for varying the resistance to rotation of said freely rotatable eccentric.

4. A variable speed transmission comprising a driving shaft and an eccentric fast thereon; a driven shaft and an eccentric free to turn thereon; a fulcrum head fast on said driven shaft between said ecentrics; and a hollow member engaged around said eccentrics and head and fulcrumed on the latter, free for turning relative to the eccentrics and for rocking on the head, but keyed to the head so that the latter must turn with said intermediate member, and means for varying the resistance to rotation of said freely rotatable eccentric.

5. A variable speed transmission comprising coaxial eccentrics, one driven from a source of power and the other freely rotatable; a member engaged with both of said eccentrics to be oscillated by them; a fulcrum for said member permitting oscillation thereof by said eccentrics; a shaft for transmitting rotation of said member due to its coaction with said eccentrics and fulcrum; a fly wheel loose on said shaft; and means coacting with said fly wheel to impart rotation thereto and to restrain the rotation of said freely rotatable eccentric.

6. A variable speed transmission comprising a driving shaft and an eccentric fast thereon; a driven shaft and an eccentric free to turn thereon; a fulcrum head fast on said driven shaft between said eccentrics; and a hollow member engaged around said eccentrics and head and fulcrumed on the latter, free for turning relative to the eccentrics and for rocking on the head, but keyed to the head so that the latter must turn with said intermediate member, a flywheel loose on said shaft; and adjustable means coacting with said flywheel to impart rotation thereto and to variably restrain rotation of said freely rotatable eccentric.

In testimony whereof, I have hereunto signed my name at Philadelphia, Pennsylvania, this 3rd day of January, 1929.

JOSEPH PERCY REMINGTON.